(12) United States Patent
Lau et al.

(10) Patent No.: US 6,411,895 B1
(45) Date of Patent: Jun. 25, 2002

(54) NAVIGATION METHOD FOR COMPUTING A TRAVEL ROUTE CONSIDERING PARKING PLACE LOCATION AND OCCUPANCY

(75) Inventors: Stefan Lau, Giesen; Heinrich Schmidt, Diekholzen; Ralf Hoffmann, Hildesheim, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/615,533

(22) Filed: Jul. 13, 2000

(30) Foreign Application Priority Data

Jul. 17, 1999 (DE) .......................................... 199 33 666

(51) Int. Cl.[7] .................................................. G06F 7/00
(52) U.S. Cl. ..................................... 701/209; 340/932.2
(58) Field of Search ................................. 701/200, 201, 701/204, 207–209; 340/932.2, 933, 905, 988, 990, 994, 995, 539

(56) References Cited

U.S. PATENT DOCUMENTS

| | | | | |
|---|---|---|---|---|
| 5,627,547 A | * | 5/1997 | Ramaswamy et al. | 342/357 |
| 5,748,107 A | * | 5/1998 | Kersken et al. | 340/905 |
| 5,877,704 A | * | 3/1999 | Yoshida | 340/932.2 |
| 5,906,654 A | * | 5/1999 | Sato | 701/210 |
| 5,910,782 A | * | 6/1999 | Schmitt et al. | 340/995 |

* cited by examiner

Primary Examiner—William A. Cuchlinski, Jr.
Assistant Examiner—Edward Pipala
(74) Attorney, Agent, or Firm—Michael J. Striker

(57) ABSTRACT

A navigation method is set forth for calculating a travel route of a vehicle from a starting or an actual vehicle location to an operator-defined destination and for guiding a vehicle operator during operation of the vehicle over and along the calculated travel route, in which at least one possible parking location at the operator-defined destination is designated and the at least one possible parking location is included in the calculating of the travel route as a location to which the vehicle is guided when the operator conducts the vehicle over the travel route. After input of the operator-defined destination into a navigation unit of the vehicle by the operator, the location to which the vehicle is guided over the travel route is determined by the navigation system advantageously automatically taking account of the available parking locations at the input destination. Either the vehicle operator can select between a number of possible parking locations proposed by the navigation system or the navigation system can automatically select the best parking location using a predetermined selection criterion. Thus the operator does not need to know the exact address of the parking locations near the destination, so that the operator is relieved of input of the address of the parking location to which the vehicle is to be guided by street name or other information in order to determine the calculated travel route.

11 Claims, 5 Drawing Sheets

NAVIGATION METHOD FOR COMPUTING A TRAVEL ROUTE CONSIDERING PARKING PLACE LOCATION AND OCCUPANCY

BACKGROUND OF THE INVENTION

1. Field of the Invention

The present invention relates to a navigation method for computing a travel route from a starting or actual location of a vehicle to an operator-defined destination and for guiding the vehicle along the calculated travel route.

2. Prior Art

The input of the destination usually occurs by giving the location name or city and street names. When the destination is located in a densely populated region, the operator of the vehicle often does not find any parking locations after reaching his or her destination and it is necessary to travel from the destination in order to search for a parking place. In order for the navigation unit to calculate the route to a predetermined parking opportunity near the destination however its exact address must be exactly known for input to the navigation unit. Those details however are usually not known to the vehicle operator in travel into a unfamiliar or foreign city.

SUMMARY OF THE INVENTION

It is the object of the present invention to provide a vehicle navigation method for computing a travel route from a starting or actual location of a vehicle to a destination and for guiding the vehicle along the calculated travel route, which does not have the above-describe disadvantage and does take vehicle parking location availability and preferably occupancy into consideration when computing the travel route to a desired destination.

These objects, and others which will be made more apparent hereinafter, are attained in a navigation method for computing a travel route from a starting location or actual location of a vehicle to an operator-defined destination and for guiding the vehicle along the calculated travel route.

According to the invention at least one parking location is designated at the operator-defined destination and is included in the route calculation as a location to which the vehicle is conducted when the operator guides the vehicle over the calculated travel route.

The navigation method according to the invention has the advantage that after input of a navigation destination by a vehicle operator a travel route from a starting vehicle location or an actual vehicle location is calculated to a possible parking location found at the navigation destination. The number of possible parking locations at the destination are automatically determined by the navigation unit and an automatic or operator-defined selection is made. The operator does need to know the exact address or location of the parking location or locations, so that the vehicle operator is relieved of the need to input a precise destination by street name or similar additional information for the route calculations.

Preferably the route calculation takes account of the parking possibilities at the designated navigation destination considering a driver-selectable or predetermined optimization criterion that does not require further effort on the part of the operator.

Similarly it is advantageous when a list with a selection of parking possibilities found at the destination, according to a predetermined suggestion, is given for selection of a parking location. It is particularly advantageous when this list is sorted according to a predetermined or given optimization criterion. This allows the operator to make an especially rapid and reliable selection of a suitable parking possibility.

It is further of advantage when the list of selected parking possibilities is offered immediately prior to reaching the destination, since then the operator or driver can decide which of the parking locations to select immediately prior to reaching the destination.

Further it is advantageous to transmit the number of free or available parking places to the vehicle-bound navigation unit so that a selection of a suitable parking location can occur with the aid of this criterion. The time consuming travel to several parking possibilities in the area surrounding the destination can thus be avoided or at least improved.

Furthermore it is advantageous that for certain reasons the vehicle operator does not select a certain parking opportunity when it is made available. In this embodiment the route to alternative parking locations is either then calculated automatically, for example by considering one or more optimization criteria, or a list of alternative parting possibilities is presented for selection. This latter list is preferably sorted according to an optimization criterion.

Finally, it is advantageous when a chosen parking place can be reserved prior to reaching it automatically by the vehicle bound navigation unit or by the vehicle operator, by means of an interface of the navigation system. This provides obvious advantages for the operator without more.

It is of special advantage when a vehicle identification, especially its official designation or identifier, is sent to the operator of the parking area, lot or places, since then an assignment of individual parking places to the vehicle reserving them is possible.

It is of additional advantage when the estimated arrival time of the vehicle reserving the parking location is communicated to the operator of the parking locations, since the parking locations can accommodate a higher load by accordingly reserving the different parking places in this manner.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
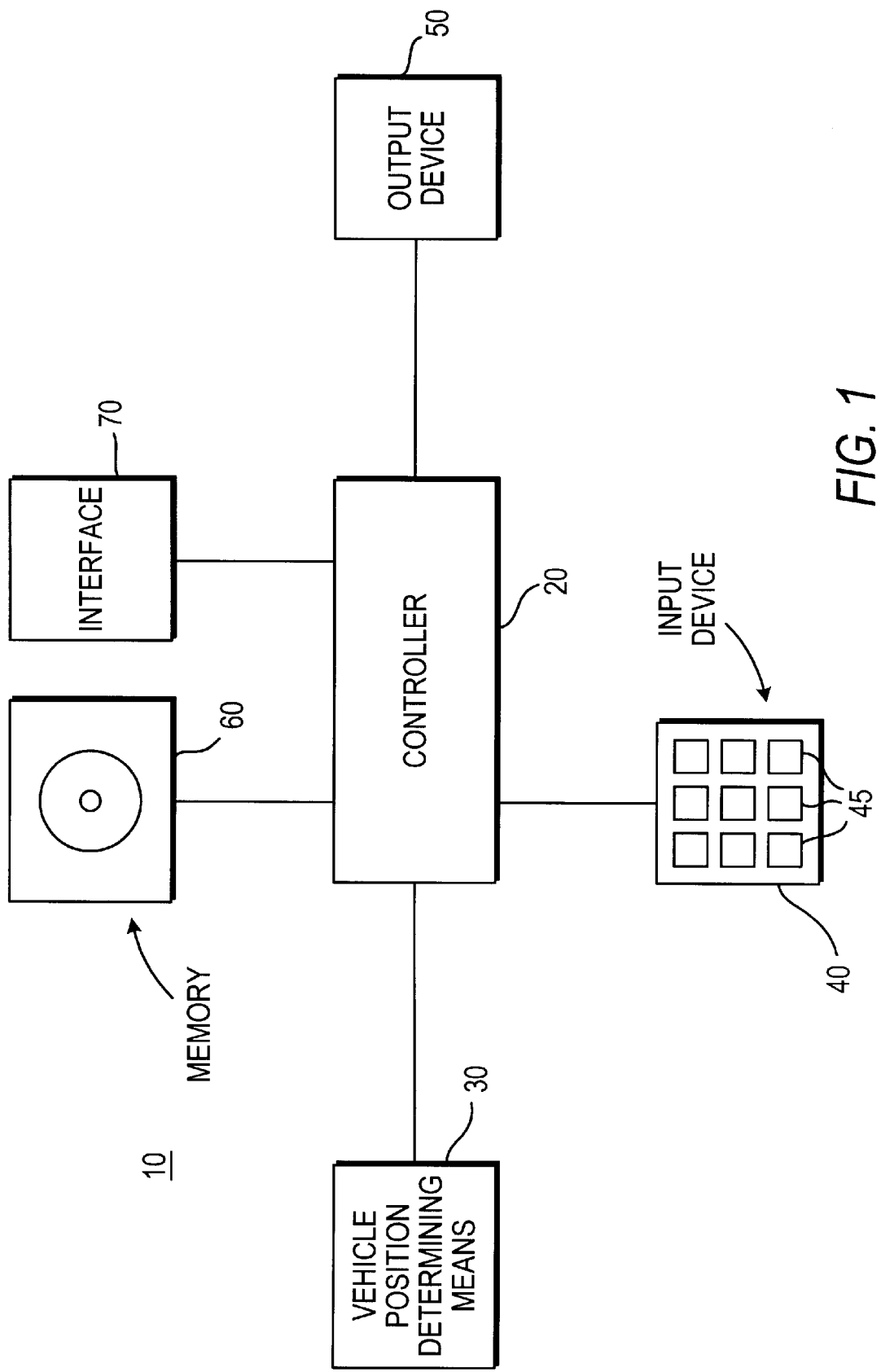
FIG. 1 is a block diagram of the essential parts of one embodiment of a navigation unit for performing the method according to the invention.

The vehicle navigation system 10 shown in FIG. 1 includes a controller 20, which, on the one hand, includes, as its central or main component, the navigation processor for calculating a travel route and, on the other hand, the means for controlling the different functions and behavior of the apparatus. The controller 20 is advantageously realized by a stored operating program, which is executed by the processor.

The controller 20 is also connected to means 30 for determining the motion state of the vehicle in which the navigation unit is operated, which includes an actual vehicle position. The means 30 for determining the motion state of the vehicle includes a speed meter, a travel distance meter, a compass based on a rotation rate sensor and a satellite receiver for reception of radio signals propagated by satellites of the global positioning system (GPS).

An input device 40 is also connected to the controller 20. The input device 40 has operating elements 45, for example in the form of keys of a keyboard, for input of a navigation destination and for operation of additional functions of the navigation unit.

For calculation of the travel route from a starting location or actual vehicle location to a destination input by means of the input device 40 the controller 20 has access to a memory 60, in which traffic route information and additional information, especially regarding parking locations, are stored. The memory 60, for example, is in the form of a CD-ROM drive. A map data base is stored on a CD-ROM, which is placed in the CD-ROM drive. Alternatively, a data service provider provides the memory and access to the data stored in the memory. The calculation of the travel route can also occur in a dialog between the vehicle navigation unit and the data service provider, by means of a communication link, for example a GSM mobile telephone.

The navigation unit 10 has an output device 50 connected with the controller 20 for guiding a driver of the vehicle along a computed travel route. The output device 50 provides travel advice and information in the form of optical and/or acoustic messages during the individual guidance process. Furthermore the output device is designed for output of possible parking locations available at a destination that were selected by the navigation processor.

In an especially advantageous embodiment of a navigation unit 10 according to the invention an interface 70 is connected with the controller 20. The interface 70, for example, is a radio device, especially a radio receiver, which can receive information, for example regarding available parking locations near the vehicle's destination. In the case of a radio receiver this information, for example, is transmitted to it within the framework of a radio data system (RDS), for example by means of a traffic message channel.

In other advantageous embodiments of the navigation unit according to the invention the above-mentioned interface 70 can be designed for bidirectional information exchange. For example, a bidirectional interface can be used for exchange of information for reservation of a parking place at a selected possible parking location at the destination, in addition to information regarding the possible parking locations or areas. The interface 70 can be a GSM mobile telephone (Global System for Mobile Communication). The information exchanged between the navigation unit 10 and the parking authority can, for example, be in the form of so-called SMS (short message service). However the information can also be exchanged over the speech channel of the mobile telephone according to the required transmission capacity.

FIGS. 2A, 2B, 3A and 3B illustrate flowcharts for two different embodiments for the method of the claimed invention. In a first embodiment a travel route is calculated not only to a travel destination from a starting location or actual location of the vehicle, but also to a given possible parking location at the destination. An optimization of the entire travel route according to a sought-after parking location can take place, for example, for certain parking buildings within a predetermined desired area with the limitation that the route should cover the shortest distance or take the shortest time to travel. In the second embodiment, in contrast, a two-step process occurs. First, a travel route from an actual starting location to a destination is determined and next after reaching the destination or shortly before it a suitable possible parking location is selected and a route to the selected parking location is then determined from the actual vehicle location at that time. This allows consideration of short duration changes, for example a search for covered or indoor parking in the selection of a parking location and accordingly in the calculation of the exact travel route.

Figure 2A:
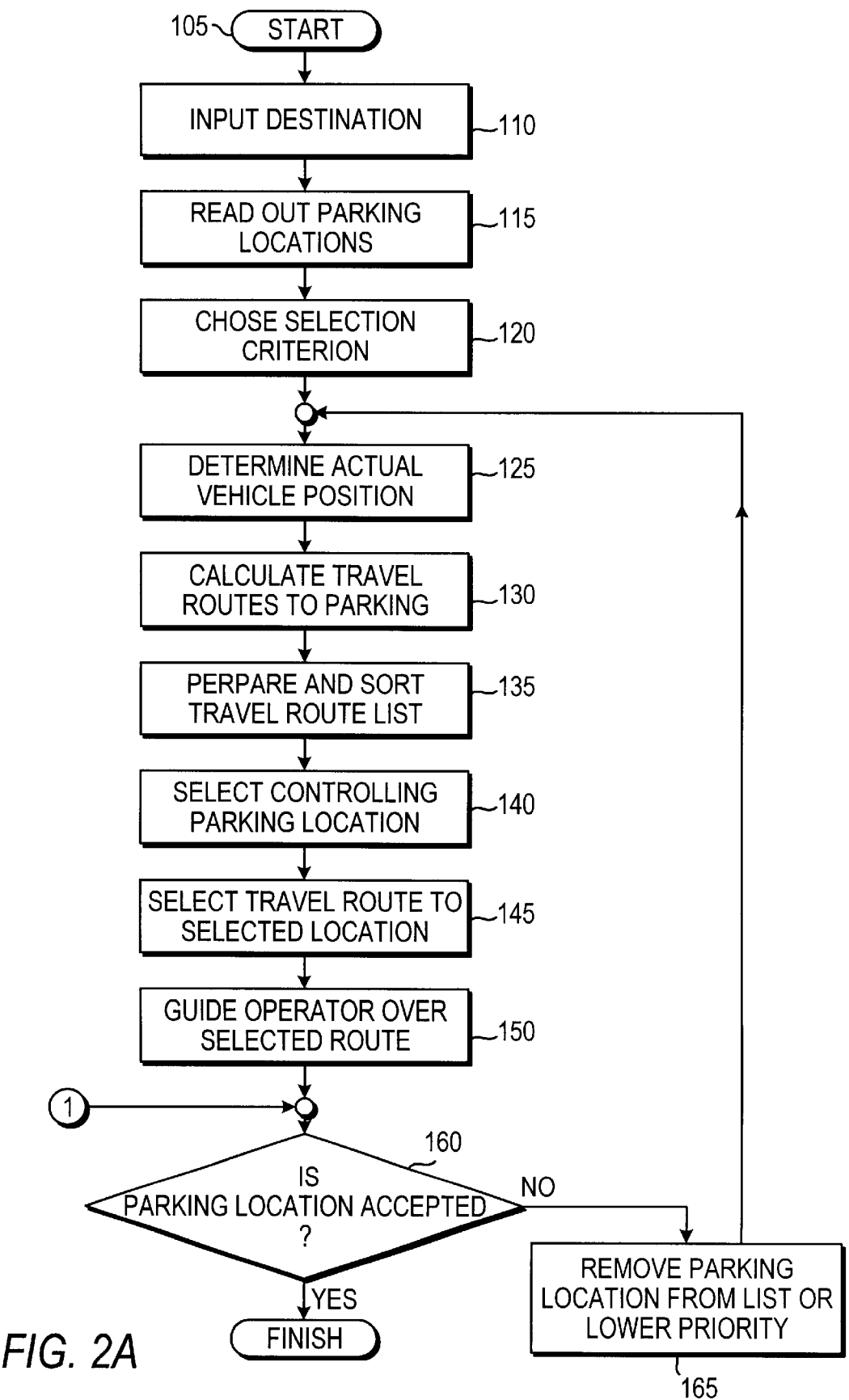
FIG. 2A is a flow chart for a first embodiment of the method according to the invention.
Figure 2B:
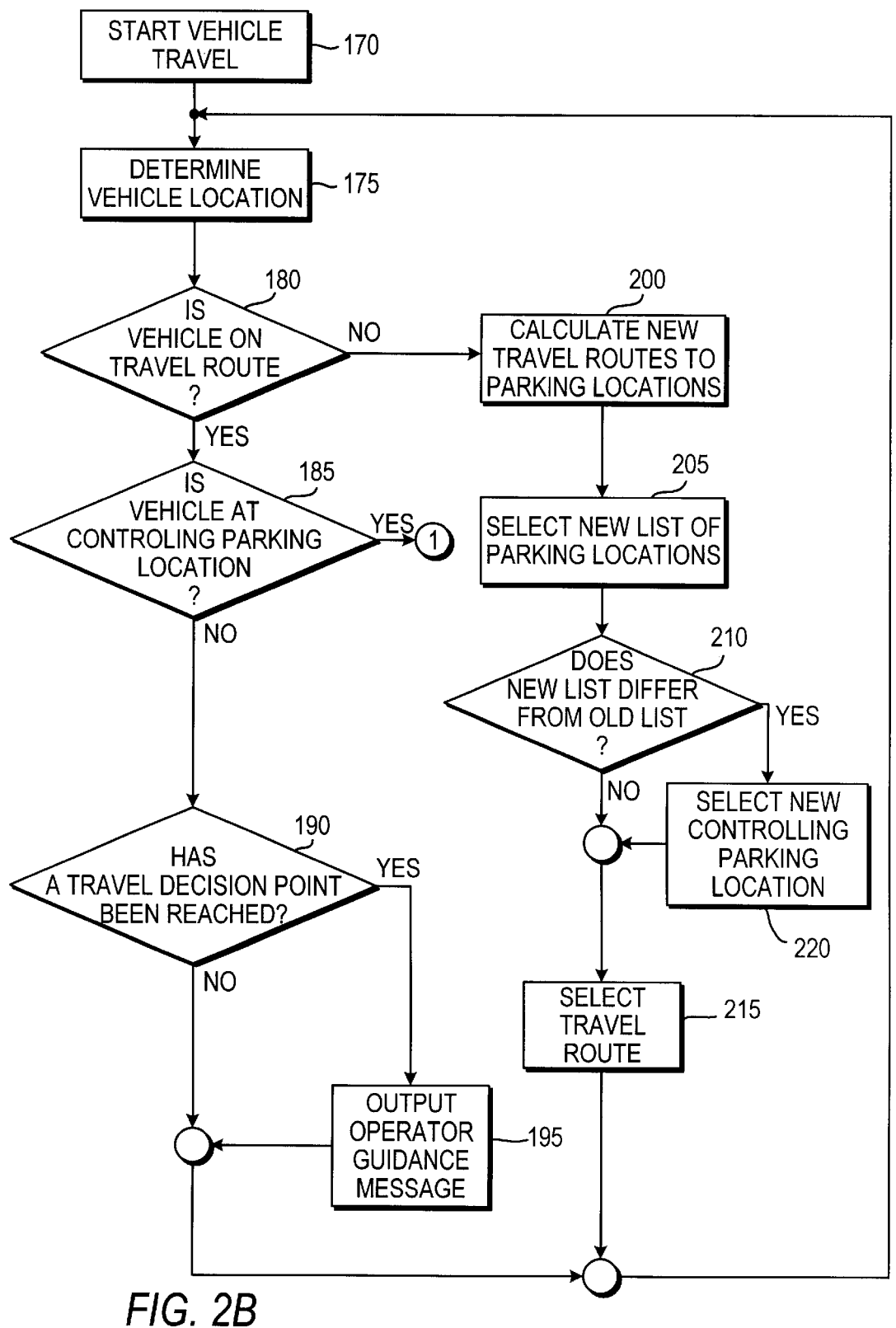
FIG. 2B is a flow chart of a method for guiding a vehicle from a starting or actual location to a selected parking location as navigation destination.

The first embodiment of the navigation process of the invention is illustrated with the aid of the flowchart shown in FIGS. 2A and 2B.

After putting the navigation unit 10 into operation (step 105) the operator is asked to input a destination and the operator-defined destination is then input by means of the input device 40, for example by input of alphabetic characters defining the location or a city name and/or by selection of the city or location name from a list (step 110). Subsequently information regarding the available possible parking locations at the destination is read out from the memory 60 of the navigation unit 10 (step 115). Additionally an optional optimization and/or selection criterion for selecting a controlling parking location at the destination can be provided or selected by the vehicle operator (step 120). These optimization criteria can include, for example, shortest distance or travel time for the selected parking location from the operator-defined destination determined according to map data;

shortest distance of the selected parking location to an interesting point at the operator-defined destination;

least possible parking fee, taking into account parking places, or other selection criteria, such as the presence of indoor or covered parking locations in parking buildings or underground garages at the selected parking location and minimum number in parking places at the selected parking location; or other selection criteria. Usually the first mentioned criterion is preferable in the above calculation. This means that without input of a selection criterion by the operator the parking location that is the closest or can be reached the quickest from the actual vehicle location is selected as the navigation destination.

In so far as a revised selection criterion without previous route computation was given for a certain type of possible parking location by the vehicle operator (step 120), for example for only covered or indoor parking places, parking buildings or underground garages, at this time the number of possible parking locations taken into consideration by the route calculation as possible destinations would be limited to those parking places which corresponded to those satisfying this latter selection criterion.

The actual vehicle location is taken as the starting location for the travel route computation. The actual vehicle location is determined by the position determining means 30, for example from the signals of the satellite receiver or position data stored during previous travel, if necessary considering signals of the vehicle speed and travel distance meters and rotation speed sensors (step 125). Travel routes are calculated to the possible parking locations at the selected destination from the actual vehicle location used as the starting location, considering map data stored in the memory 60, especially traffic route information (step 130). A list of travel routes is prepared and sorted (step 135), preferably according to an operator-defined or given optimization criterion, for example shortest travel distance from the actual vehicle location point to the possible parking locations, to all possible parking possibilities determined in step 130. From this list of travel route possibilities one actual parking location is selected (step 140) as the controlling parking location either automatically by the navigation unit or by the operator of the vehicle. In the first case that parking location is selected which is best fits the optimization criterion, preferably also listed first in the list of travel routes. In the second case the list of possible parking locations is displayed or otherwise output on the output device 50 of the navigation unit, preferably together with additional information, for example with a map display, on which the parking locations are shown, so that the vehicle operator can make a qualified selected based on his or her personal preference. Subsequently that travel route is selected by the navigation unit for a subsequent operator guiding process, which is associated with the selected parking location based on the previous travel route calculations (step 145). The individual operator guiding process illustrated with the aid of the flowchart of FIG. 2B occurs after that. This means that the guiding of the vehicle operator along the calculated travel route occurs from the actual vehicle location taken as the starting location to the selected parking location at the destination (step 150).

If the vehicle operator arrives with his or her vehicle at the selected parking location during the guiding process, either the vehicle is parked at this location or the operator can reject this possible parking location, for example because there are no free or empty parking places for the vehicle. In step 155 whether or not the vehicle operator accepts or rejects the selection parking location is determined. In the first case, if the vehicle is parked at this possible parking location, the navigation process ends (step 160). In the other case, this possible parking location is removed from the list of possible parking locations or given lowest priority in further selection processes, preferably the last place (step 165). Subsequently the process continues with a new starting location determination (step 125) and new travel route calculations from the new vehicle starting place to the possible parking locations and the following steps takes place as described above.

Subsequently the above-mentioned operator guiding process from the actual vehicle location to the selected parking location at the destination (step 15) occurs as explained in detail with the aid of the flowchart in FIG. 2B.

The individual operator guiding process starts usually when the vehicle begins to travel or is put in motion (step 170). After determination of the actual vehicle position (175 analogous to step 125) whether or not the actual vehicle position is found on the calculated travel route according to the route calculation from the starting point to the selected possible parking location (step 180). If this is the case, whether or not the vehicle is already at the selected parking location is tested (step 185) subsequently. If this is the case, of course the operator guiding process ends and the method jumps via "1" to step 155. In the alternative case, testing occurs to determine whether or not a decision point has been reached, for example a turning point at an intersection, also a point at which a travel advisory for the operator should be output, with the aid of a comparison of the actual vehicle position with the calculated travel route (step 190). If this is the case, a travel advisory is output preferably in acoustic form, for example "Turn right at the next intersection!", by the output device 50 of the navigation unit (step 195). Alternatively, or in addition, a travel advisory can also be output optically, for example in the form of a directional arrow and a remaining distance to the turn sign (step 195). In any case, if no decision point has been reached, the process continues with step 175, also a new position determination.

If in contrast to the previous supposition, it is established that the actual vehicle standing location is not found on the calculated travel route from the starting location to the possible parking location, a new travel route calculation from the actual vehicle location as starting point to all the possible parking locations at the predetermined input destination is performed (step 200). Thereafter a new list of possible parking locations, preferably considering either the standard optimization criterion or the operator-defined optimization criterion, is set up (step 205). If this list of possible parking locations differs from the originally selected list, especially in regard to the prioritizing of the preferred possible parking locations, (step 210) so that the vehicle can reach another possible parking location faster or by a more direct route than the originally selected possible parking location, a parking location is then selected from the new list of possible parking locations as the new controlling possible parking location (step 220). Subsequently the travel route to either the newly selected controlling possible parking location or to the controlling possible parking location from the original list of parking locations(step 215). Subsequently the operator guiding process continues with step 175, also a new vehicle location determination takes place.

Figure 3A:
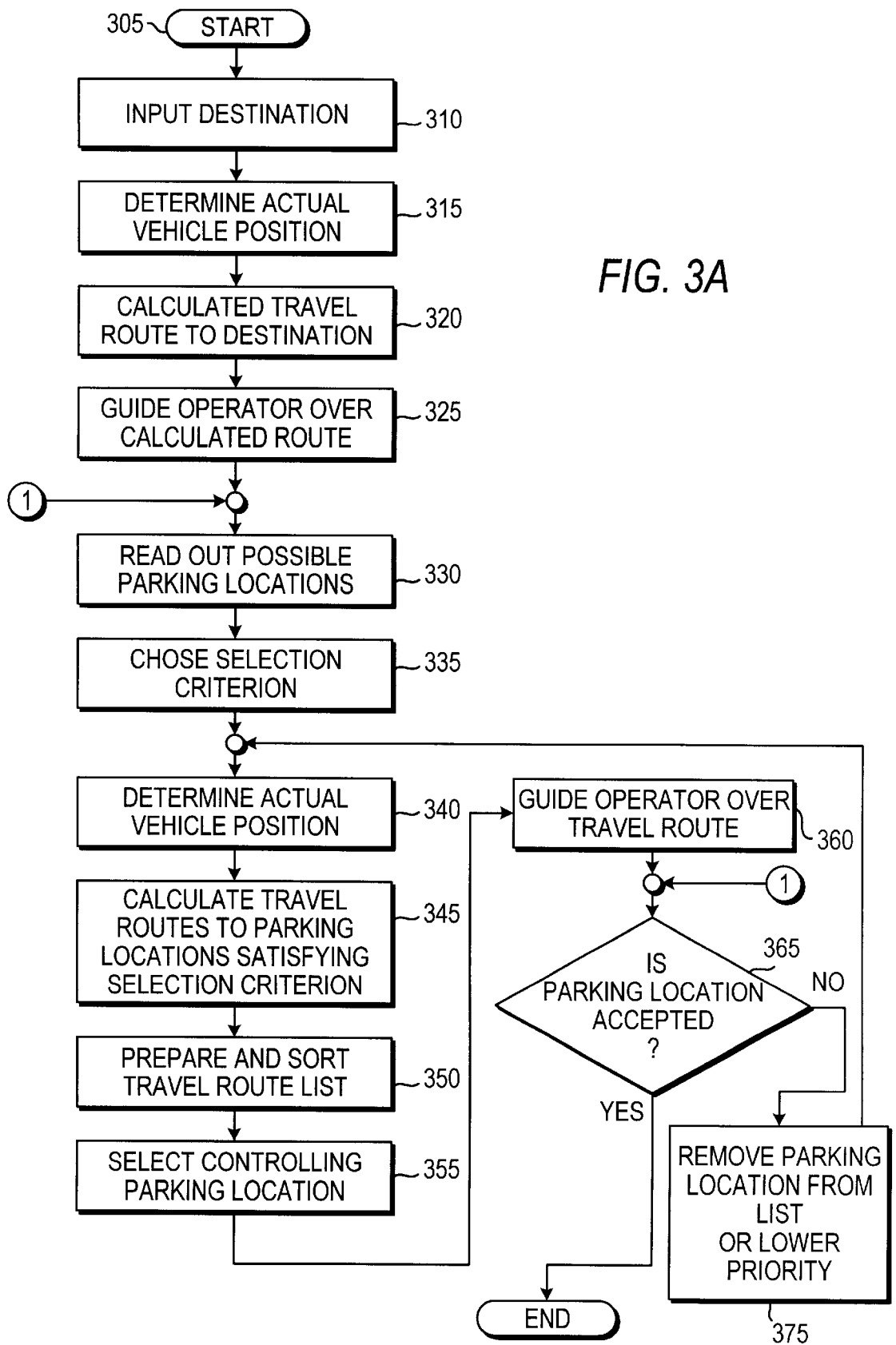
FIG. 3A is a flow chart of a second embodiment of the method according to the invention.
Figure 3B:
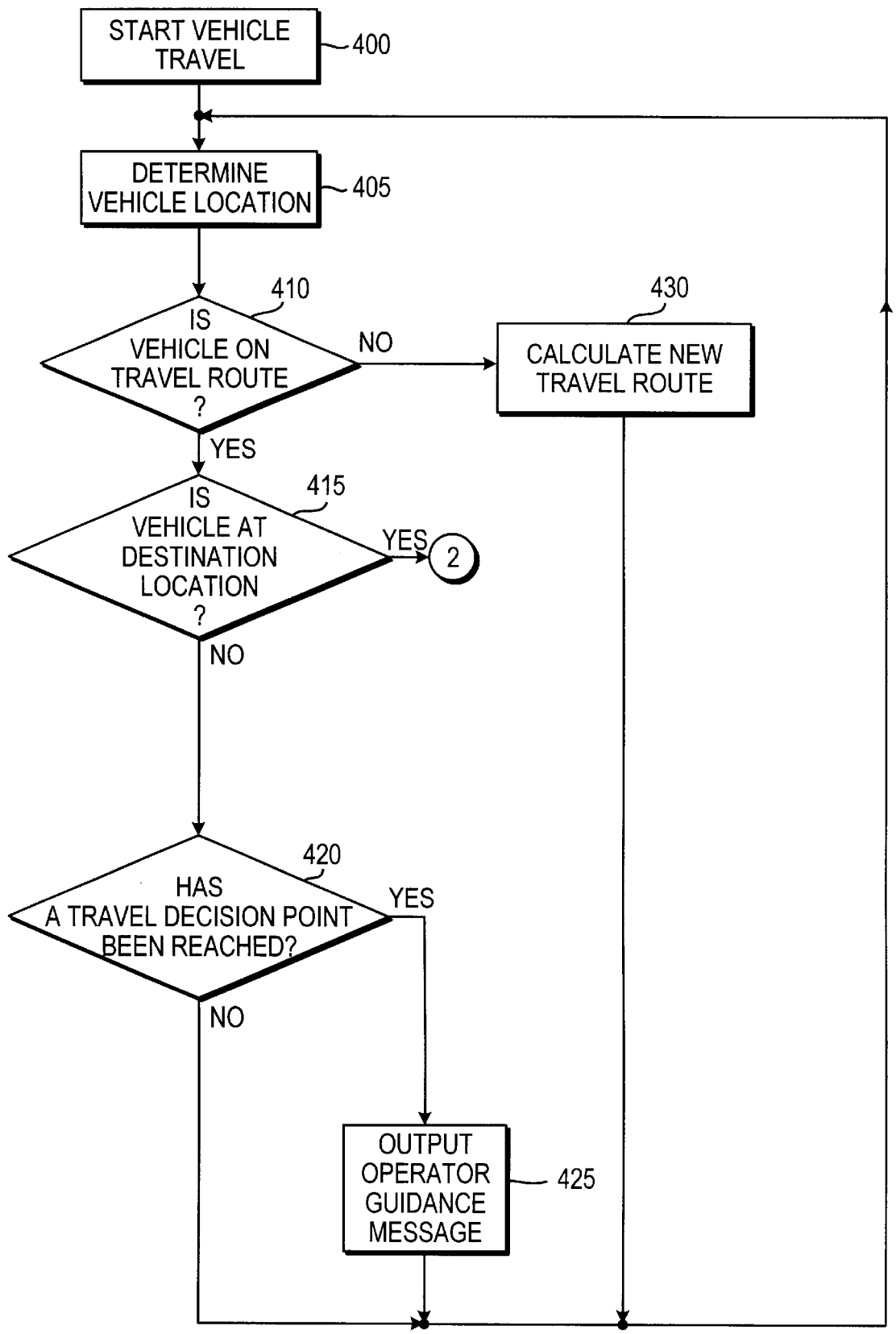
FIG. 3B is a flow chart of a method for guiding a vehicle from a starting or actual location to the navigation destination.

The second embodiment of the navigation method according to the invention is described with the aid of FIGS. 3A, 3B and 2B.

After starting the navigation unit 10 (step 305) the vehicle operator is requested to input a destination for a route calculation. After that the operator, inputs the destination (step 310), for example by inputting a place name with alphabetical characters, by means of the input device 40. Thereafter the route calculating processor of the navigation unit determines the actual vehicle location (step 315) based on information from the position determining means 30 and calculates a vehicle travel route from the actual vehicle location to the destination location, considering map data stored in the memory 60, especially that containing traffic route information (step 320). Subsequently the operator is guided from the actual vehicle location to the destination (step 325), which subsequently is explained in detailed with the aid of the flowchart of FIG. 3B.

When the vehicle reaches the city limits or a point shortly before the city limits during the operator guiding process to the destination, the possible parking locations available at the destination are read out from the memory 60 (step 330). The vehicle operator can optionally input an optimization or selection criterion for selection of a certain parking location from the number of available parking locations (step 335). If the vehicle operator does not input any selection criterion, a preset selection criteria, for example shortest possible travel distance to the parking location, is used as the selection criteria (step 335). Already at this time, without prior route calculation, the correspondence of the available possible parking locations with one or more predetermined selection criteria, for example the requirement for a covered or indoor parking place, a parking building or a parking garage, takes place. The number of possible parking places is then limited to those that satisfy the selection criterion.

Subsequently the actual vehicle location is determined (step 340) based on the information from the position determining means 30 and calculation of the travel routes would be limited to total number of available parking locations would take place in as much as that number has already been limited (step 345). Subsequently a list of the number of available parking possibilities, reduced as needed, is produced (step 350), preferably according to a predetermined or additional optimization criterion (step 350). A prioritized possible parking location and a travel route to it are selected from this group of available parking locations automatically according to the optimization criterion (step 355). Alternatively the list of the possible parking possibilities can be displayed to the operator on the output device 50 for selection of the chosen parking location. In the case that the operator makes no selection, for example the first list entry next to that preselected according the optimization criterion is automatically selected. Subsequently the already described operator guiding process from the actual vehicle location to the selected parking location (step 360) occurs as described with the aid of the flow chart of FIG. 2B. After the end of the operator guiding process the navigation method continues with step 365. In this latter step whether or not the parking location that has been reached will be used or rejected because it does not have free parking places is tested. In the first case, when the vehicle is parked in the controlling parking location, the navigation process ends (at step 370). In the other case, when the parking location that has been reached is rejected, either it is removed from the reduced list of possible parking locations at the current destination location or its priority is reduced (Step 375) and the process continues with step 340, and also with a new actual vehicle position determination.

Subsequently the above-mentioned operator guiding process from the starting or actual vehicle location to the selected destination location (step 325, FIG. 3A) is explained with the aid of the flow chart shown in FIG. 3B.

This starts with the starting of the vehicle, in which the navigation unit is operated (step 400). Then the actual vehicle location is determined from the information obtained from the position determining means 30, preferably with an additional adjustment of the vehicle position determined in this way with the map data base in the sense of a plausibility check, which is generally known by the designation "Map matching" (step 405). After that whether or not the actual vehicle position is on the travel route already calculated from the starting location to the destination location is determined (step 410). If this is the case, whether or not the vehicle has reached the predetermined destination location, or preferably the city limits of the predetermined destination location, is tested (step 415). Instead of this whether or not the vehicle has reached a predetermined distance to the city center or to the city limits, or the like, may be tested. If the destination in the sense of the previous definition, also for example the city limits, or for example a point 10 km from the city limits is reached, the individual operator guiding process from the actual vehicle location to the destination location is terminated and subsequently the determination of the possible parking locations at the destination location occurs (step 330, FIG. 3A). The route calculation to the selected parking location then occurs, and the process shown in FIG. 3A continues. In the other case, when the destination has not been reached, whether or not a decision point, i.e. a point at which a travel advisory must be transmitted to the vehicle operator, for example at a turning point, is tested (step 420). When a decision point has been reached, a travel advisory is output in order to guide the operator along the calculated travel route, for example in acoustic form, optionally accompanied by a suitable optical signal, by means of the output device 50 (step 425). After that, similar to the case in which no decision point has been reached in the previous embodiment, the process returns to step 405 in which the actual vehicle position is again determined because of its change in position during travel. If in step 410 it is determined that the vehicle is not on the calculated travel route, a state, which for example can occur when the operator does not follow the travel advisory, a new route calculation from the current actual vehicle location to the predetermined destination location takes place considering the map information stored in the memory 60 (step 430). Another operator guiding process is set up based on the new calculated travel route. Subsequently the process goes to step 405 and a new actual vehicle location is determined. When the vehicle operator has halted after deviation of the original travel route and an appropriate announcement by the navigation unit, in order to await a new route calculation, in step 410 the correspondence between the actual vehicle location and the newly calculated route is determined. If in contrast the vehicle operator travels further from the route, it is possible that the route must be recalculated many times, since the vehicle operator unconsciously is deviating from the newly calculated routes during further travel.

A third embodiment of the invention, which is performed in connection with the first and also the second embodiment, provides that information regarding the occupancy condition of the possible parking locations available at the vehicle destination is transmitted to the navigation unit. This communication can preferably occur by radio broadcast, for example over a traffic message channel (TMC) embodied in a radio data system (RDS). The radio data system transmits information at a radio transmission frequency in the form of digital data, which are transmitted over a modulated auxiliary carrier outside of the audible range. A portion of this data is the so-called traffic message channel which was originally provided for transmission of digital coded traffic information.

Alternatively respective occupancy states of the corresponding parking locations at the destination are transmitted over a mobile telephone link between the vehicle navigation unit and a data service provider.

If the information is now received, for example, by means of a receiver for wireless reception of this data, e.g. a radio receiver, that discloses that a certain possible parking location is completely occupied, no free parking places are available, this situation can be considered in the navigation process, so that the concerned parking location can be removed from the list of available parking locations at the destination location. In the case of the first embodiment this has the consequence, in as much as the concerned parking location corresponds to the selected parking location, that a new route calculation from the actual vehicle location to the remaining available parking locations and a new selection of a parking location from the number of available parking locations takes place. In the case of the second embodiment preferably the list of the available parking locations is correspondingly reduced according to the occupancy announcement. A new route calculation then is required only, when the actual vehicle location at the time of the announcement is within the city limits of the destination location or is within a predetermined periphery around the city limits or at the city center of the destination location according to the form of the embodiment.

A fourth embodiment of the navigation method according to the invention, which is embodied in connection with the previously described first three embodiments of the method according to the invention, provides that after selection of a certain parking possibility at the destination location a reservation of a parking place within the selected parking locations is made by means of a radio link. The navigation unit also makes a link by a mobile telephone link 70, for example to a city parking authority, or also the a parking building or underground garage operator, and sends a reservation request for a parking place at or in a predetermined parking location. Preferably also at least one feature characteristic of the vehicle is transmitted to the parking authority, preferably its official government registration designation. It reserves a free parking place within the desired parking location, for example by a sign placed in at least one part of the parking place, on which the vehicle designation or number of the vehicle is shown. In the case of the first embodiment it is significant that in addition to the above-mentioned information also the expected arrival time of the vehicle at the selected parking location is transmitted so that a parking place must be reserved at the expected arrival time of the vehicle at the selected parking location. The expected arrival time can, of course, be previously calculated based on the map data base information.

When free parking spaces are scarce at the destination location it is also significant, also in the case of deviations from the calculated travel route, to maintain the selected parking possibility as travel destination, or to transmit a change of the selected parking possibility, as well as the originally selected parking location, as the new selected parking location, as soon as possible in order to allow an early booking of a parking place reservation.

The disclosure in German Patent Application 199 33 666.0 of Jul. 17, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a navigation method for calculating a travel route of a vehicle from a starting location or an actual vehicle location to a travel destination, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

We claim:

1. A navigation method for calculating a travel route of a vehicle from a starting or an actual vehicle location to an operator-defined destination and for guiding a vehicle operator during operation of the vehicle over and along the travel route, said method comprising designating at least one possible parking location at the operator-defined destination; calculating the travel route from the starting or the actual vehicle location to the operated-defined destination including said at least one possible parking location in the calculating of the travel route as a location to which the vehicle is guided when the operator conducts the vehicle over said travel route; and guiding the vehicle to the location determined by the calculation of the travel route with the inclusion of said at least one possible parking location.

2. A navigation method as defined in claim 1; and further comprising including said at least one possible parking location in the calculation of the travel route as a location to which the vehicle is guided when the operator conducts the vehicle over said travel route, before guiding the vehicle to the location.

3. A navigation method as defined in claim 1; and further comprising including said at least one possible parking location in the calculation of the travel route as a location to which the vehicle is guided when the operator conducts the vehicle over said travel route, during guiding the vehicle to the location.

4. A navigation method for calculating a travel route of a vehicle from a starting or an actual vehicle location to an operator-defined destination and for guiding a vehicle operator during operation of the vehicle over and along the travel route, said method comprising the steps of:

a) designating a plurality of possible parking locations at the operator-defined destination;

b) calculating the travel route from the starting or the actual vehicle location to the operated-defined destination;

c) selecting one of said possible parking locations by means of an optimization criterion as a location to which the vehicle is guided and when the operator conducts the vehicle over said travel route; and d) and guiding the vehicle to the location determined by the calculation of the travel route with the inclusion of said at least one possible parking location.

5. The navigation method as defined in claim 4, wherein the optimization criterion is selected from the group consisting of shortest distance to the said location to which said vehicle is guided at the operator-defined destination according to map data; shortest time to the said location to which said vehicle is guided at the operator-defined destination according to map data; shortest distance of said location to which said vehicle is guided to an interesting point at the operator-defined destination; least possible parking fee at said parking location at said location to which said vehicle is guided; presence of indoor or covered parking places in parking buildings or underground garages at said location to which said vehicle is guided and minimum number of occupied parking places at said location to which said vehicle is guided.

6. The navigation method as defined in claim 4, wherein said plurality of said possible parking locations are first selected from among a number of parking possibilities.

7. The navigation method as defined in claim 5, further comprising transmitting a total number of parking places at all or at least one of said possible parking locations over a communication interface to the vehicle and taking account of said total number of the parking places at all or at least one of said possible parking locations in the calculating of the travel route.

8. The navigation method as defined in claim 7, further comprising transmitting a reservation request for one of the parking places at said location to which said vehicle is guided a parking operator at said location by means of the communication interface.

9. The navigation method as defined in claim 8, further comprising transmitting a vehicle identifier with the reservation request to the parking operator.

10. The navigation method as defined in claim 9, wherein said vehicle identifier is a license plate number on a license plate of the vehicle.

11. The navigation method as defined in claim 9, further comprising transmitting over said communication interface an estimated time at which said vehicle arrives at said location to which said vehicle is guided.

\* \* \* \* \*